United States Patent [19]

Dickey

[11] 4,214,388

[45] Jul. 29, 1980

[54] ADHESIVE LAYER POCKETED SCROLL FOR READING MACHINE

[75] Inventor: Herbert C. Dickey, North Reading, Mass.

[73] Assignee: The Ealing Corporation, South Natick, Mass.

[21] Appl. No.: 924,496

[22] Filed: Jul. 14, 1978

Related U.S. Application Data

[63] Continuation-in-part of Ser. No. 772,982, Feb. 28, 1977, abandoned, which is a continuation-in-part of Ser. No. 581,588, May 28, 1975, Pat. No. 4,020,576.

[51] Int. Cl.³ .......................... A47G 1/17; G03B 21/64

[52] U.S. Cl. ....................................... 40/159; 156/252; 156/289; 206/390; 229/69; 428/192

[58] Field of Search .................. 40/405, 159; 156/289, 156/252; 428/192, 194; 206/390; 229/69

[56] References Cited

U.S. PATENT DOCUMENTS

| | | | |
|---|---|---|---|
| 1,689,528 | 10/1928 | Kjellerup | 40/159 |
| 2,427,229 | 9/1947 | Riley | 156/252 |
| 2,748,048 | 5/1956 | Russell | 156/289 |
| 3,475,247 | 10/1969 | Freundlich | 156/289 |
| 3,866,648 | 2/1975 | Anderson | 40/159 |
| 3,921,319 | 11/1975 | Styers et al. | 40/159 |

FOREIGN PATENT DOCUMENTS

| | | | |
|---|---|---|---|
| 582039 | 9/1958 | Italy | 156/289 |
| 308106 | 3/1929 | United Kingdom | 40/159 |

*Primary Examiner*—John W. Shepperd
*Attorney, Agent, or Firm*—Anthony H. Handal

[57] ABSTRACT

A pocketed scroll for the holding and display of pages of reading material in a reel-to-reel reading machine is disclosed. The scroll comprises a flexible planar backing sheet having a width and a length much longer than its width. A layer of adhesive is disposed over the flexible backing sheet. Pocket-forming flexible planar means is disposed over the layer of adhesive, and defines spaces in the shape of bands periodically spaced along the length of said pocket-forming sheet. The bands extend across the width of the pocket-forming sheet. A flexible transparent planar facing sheet is disposed over the pocket-forming sheet and adheres to the backing sheet in the area defined by the spaces.

9 Claims, 5 Drawing Figures

ADHESIVE LAYER POCKETED SCROLL FOR READING MACHINE

CROSS REFERENCE TO RELATED APPLICATIONS

This application is a continuation-in-part of U.S. patent application Ser. No. 772,982 2-28-77, now abandoned, entitled Adhesive Carrier and Method for the Display of Reading Materials in Automatic Reading Systems, which is, in turn, a continuation-in-part of my application entitled Carrier for the Presentation of Pages of Conventional Reading Materials, Ser. No. 581,588, 5-28-75 now U.S. Pat. No. 4,020,576, the disclosures of which are hereby incorporated by reference.

BACKGROUND OF THE INVENTION

The present invention relates to reel-to-reel carrier systems which are adapted to hold conventional pages containing printed material and present them in an automatic reading apparatus. Such a reading apparatus is shown in U.S. Pat. No. 3,882,620 entitled Apparatus and Method for the Presentation of Reading Materials. In this patent, a system is disclosed in which reading material is printed on a long scroll which is carried within a reel-to-reel system.

In the most modern machines, such as that disclosed in U.S. Pat. No. 3,983,691 entitled Apparatus for the Presentation of Reading Materials, pocketed carriers as well as printed scrolls are carried within reel-to-reel cassettes. Cassette systems are particularly advantageous inasmuch as they allow a reading machine user, who typically may suffer from some disability which makes it impossible for him to use a conventional book, to select from a library of cassettes and thus read a desired publication.

A major development in the evolution of reading machines was the development of pocketed carriers such as the one illustrated in U.S. Pat. No. 4,020,576, entitled Carrier for the Presentation of Pages of Conventional Reading Material. The carrier disclosed in that patent comprised a long backing sheet to which a transparent facing sheet was selectively laminated to form a series of page receiving pockets. In accordance with the embodiment disclosed in that patent, one of the sheets would be made of vinyl or polyethylene and the other sheet would be made of one of the same materials or mylar or paper. Naturally, the facing sheet would have to be transparent in order that pages of reading material inserted in the pockets would be visible through the facing.

While such systems were certainly an advance over conventional printed scrolls because they made it possible to use already existing books and magazines, they did suffer from a number of significant disadvantages. For example, polyethylene and vinyl facing sheets failed to have the desired clarity. This made reading of the scroll tiring to the eyes of users. This situation was aggravated by the fact that the vinyl or polyethylene sheets, in order to have sufficient strength to perform their task, without losing shape or tearing, had to be relatively thick. One of the sheets had to be made out of vinyl or polyethylene because pockets were formed by heat lamination and materials such as mylar did not lend themselves to this process. Likewise, glues are not a practical way of securing facing sheets to a backing sheet. If, on the other hand, a mylar sheet is used as a facing sheet and vinyl as a backing sheet, the thickness of the vinyl (typically about 0.005 inch) required for the necessary strength results in a substantial difference in the length of the paths along which the different layers are wound. The presence of seams between the facing and backing sheets thus results in wrinkling of the backing sheet. An additional problem encountered is the fact that the relatively thick layers of material greatly reduce the capacity of the reel-to-reel system. Still another problem encountered was the sluggishness and friction created by thick vinyl or polyethylene layers. Additionally, the vinyl tended to stretch and lose its shape and thus failed to operate smoothly within the system.

In an attempt to remedy the difficiencies of such scrolls, the adhesive scroll was developed. Such a scroll is described in my co-pending application filed Feb. 28, 1977, entitled Adhesive Carrier and Method for the Display of Reading Materials in Automatic Reading Systems, and bearing Ser. No. 772,982. In accordance with the embodiment disclosed in that patent, a scroll comprising a paper backing sheet and non-permanent adhesive is contained within a reading machine reel-to-reel cassette. When it is desired to use this carrier, pages of printed material are adhered to the carrier in sequence. After this has been done, the pages of printed material adhering to the carrier may be viewed during automatic display by a handicapped individual. Although this carrier suffered from some of the problems of pocketed carriers, it did have a number of advantages. The carrier had a basically one-rigid-layer configuration and it eliminated wrinkling problems due to the temporary and shiftable nature of the adhesive layer. However, the adhesive bacame fatigued with time and use, making the carrier unreliable.

In accordance with the present invention, virtually all of the problems of the prior art noted above are eliminated or very substantially reduced. Longevity, durability and ease of operation are achieved by modification of the adhesive scroll by maintaining the multilayered construction while varying the composition of the layers and adding additional structural elements to produce a pocketed carrier.

SUMMARY OF THE INVENTION

In accordance with the present invention a pocketed carrier for the presentation of pages of conventional printed matter in scroll form within a reel-to-reel reading machine is provided. The carrier comprises a backing sheet having a width, and a length much longer than its width. A relatively thin and transparent facing sheet having a width and a length much longer than its length is disposed over the backing sheet. A layer of adhesive material having a width and a length substantially longer than its width is provided. The adhesive material is different from the material of which the facing sheet is made. The adhesive material is positioned between the facing and backing sheet and is secured to one of either the facing or backing sheet and is separate from the other sheet. A sheet means is disposed between the adhesive layer and the other sheet. The sheet means is positioned, configured and dimensioned to achieve selective adhesion between the facing and backing sheets along seams disposed across the width of the facing and backing sheets during activation of the adhesive layer. The seams are positioned, configured and dimensioned to define a plurality of pockets disposed along the length of the carrier. Each of the pockets is defined between a pair of adjacent seams.

DETAILED DESCRIPTION OF THE PREFERRED EMBODIMENTS

Figure 1:
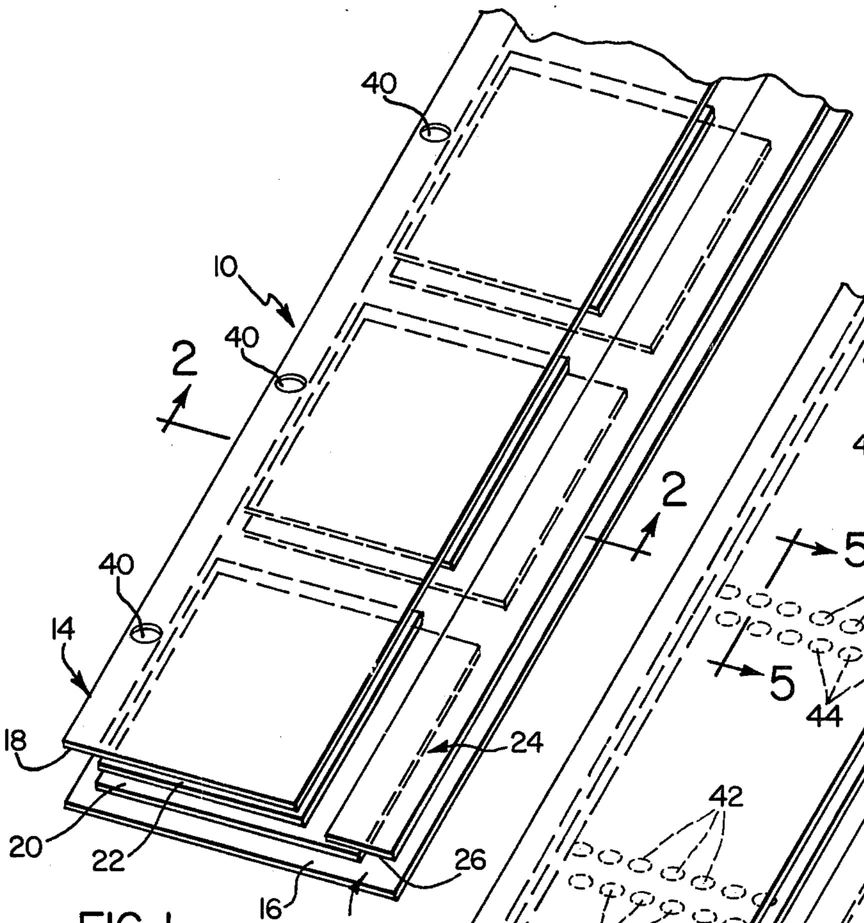
FIG. 1 is a view in exploded perspective of a carrier constructed in accordance with the present invention.
Figure 2:
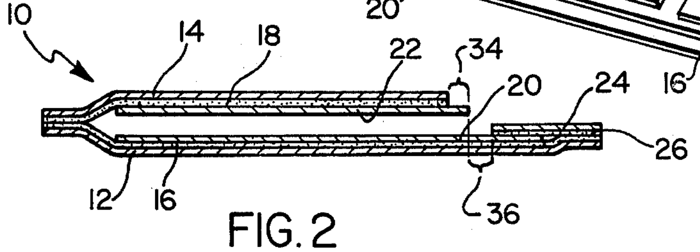
FIG. 2 is a cross-sectional view of the inventive carrier.

Referring to FIGS. 1 and 2, a carrier 10 constructed in accordance with the present invention comprises a backing sheet 12 and a facing sheet 14. A heat-activated adhesive layer 16 is deposited on the inside face of the backing sheet 12. Likewise, a heat-activated adhesive layer 18 is deposited on the inside surface of facing sheet 14. Each pocket in the carrier is defined between a non-adhesive backing member 20 and a non-adhesive facing member 22. An end strip 24 adheres to the edge of the carrier through the action of its adhesive layer 26, lending strength to the overall configuration.

During fabrication of the inventive carrier, the various component parts of the carrier are assembled in their desired positions, as is illustrated in exploded perspective in FIG. 1. For the sake of convenience, backing sheet 12, facing sheet 14 and end strip 24 and their associated heat-activated adhesive layers may all be made of the same material. In accordance with the preferred embodiments, the actual members themselves may be made of mylar having a thickness of about 0.0015 inch. Adhesive layers 16,18 and 26 may all comprise polyethylene having a thickness of about 0.002 inch. Likewise, backing and facing members 20 and 22 may be made of mylar having a thickness of about 0.0015 inch. Inasmuch as these thicknesses are very much thinner than conventional vinyl layers, very significant advantages are obtained.

The mylar is selected for its exceptional strength and clarity in extremely thin layers. This minimizes path-length differences between the facing and backing sheets. Likewise, the mylar does not stretch or deform with temperature. Accordingly, it is difficult to join mylar to mylar thus making the simplified construction of conventional vinyl to vinyl scrolls impossible without severe losses in economy. Accordingly, it becomes necessary to use an adhesive to join the mylar layers together. This adhesive could be called a latent adhesive inasmuch as it is not adhesive until activated by the application of heat, pressure, or a solvent. In this embodiment, the adhesive is polyethylene which is deposited in uniform layers on facing sheet 14, backing sheet 12 and end strip 24.

The polyethylene is selected for its excellent adhesive properties, even when it is deposited in thin films, as well as its clarity and durability under repeated deformation. In areas of critical strain where good adhesion is particularly important, the layer of polyethylene faces another layer of polyethylene thus making a strong permanent bond particularly easy to achieve.

Figure 3:
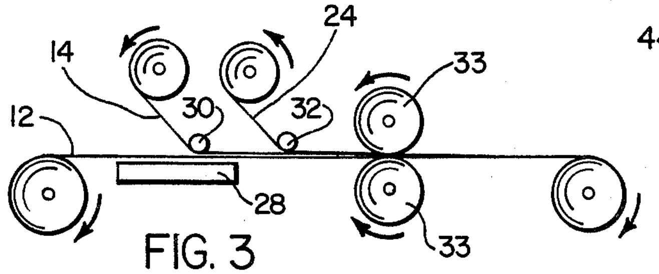
FIG. 3 is a schematic diagram of an apparatus for manufacturing carriers in accordance with the present invention.

Referring to FIG. 3, a carrier constructed in accordance with the present invention may be made by assembling the parts and applying heat to make the configuration that they are assembled into permanent. Backing sheet 12 is fed in roll form at a constant rate of speed over table 28. Backing and facing members 20 and 22 are then placed on top of backing sheet 12. Proper placement of members 20 and 22 may be achieved by painting appropriate markings on table 28 which markings are visible through backing sheet 12 and would serve as guides for the placement of members 20 and 22. Facing sheet 14 and end strip 24 are then fed from rolls as illusin FIG. 3 over the backing sheet, which has the backing and facing members 20 and 22 disposed on it. The placement of facing sheet 14 and end strip 24 into contact with the backing sheet 12 is guided by idlers 30 and 32.

After the inventive carrier is assembled, it passes between a pair of heated rollers 33 which melt the polyethylene, causing it to adhere to an adjacent mylar or polyethylene layer. As noted, between facing and backing members 20 and 22 there is no polyethylene and, accordingly, a pocket is formed. In order to prevent sealing of the pocket, facing sheet 14 extends only to a point removed from the edge of facing member 22 by about 0.5 cm. This distance is indicated by bracket 34 in FIG. 2. Likewise, the inside edge of the end strip 24 is also removed from the edge of facing member 22 by a distance 36. Distance 36 is also about 0.5 cm. After the carrier is formed, it is punched with holes in the positions indicated by circles 40 in FIG. 1.

As noted above, one of the primary problems encountered in prior art scrolls is the fact that wrinkling of the backing sheet occurs. This wrinkling is caused by the difference in the path lengths of the facing and backing sheets, when they are wound on a spool. If desired, lamination of the element via the application of heat, pressure and cooling may be done while the carrier is in a curved condition. This will give the carrier a natural curl and an inherent difference in path length which is about equivalent to the average curve that it will assume when rolled on the reel. This inherent curve should substantially eliminate even the small amount of wrinkling that may occur when multi-layer mylar/polyethylene thin film structures are used.

Figure 4:
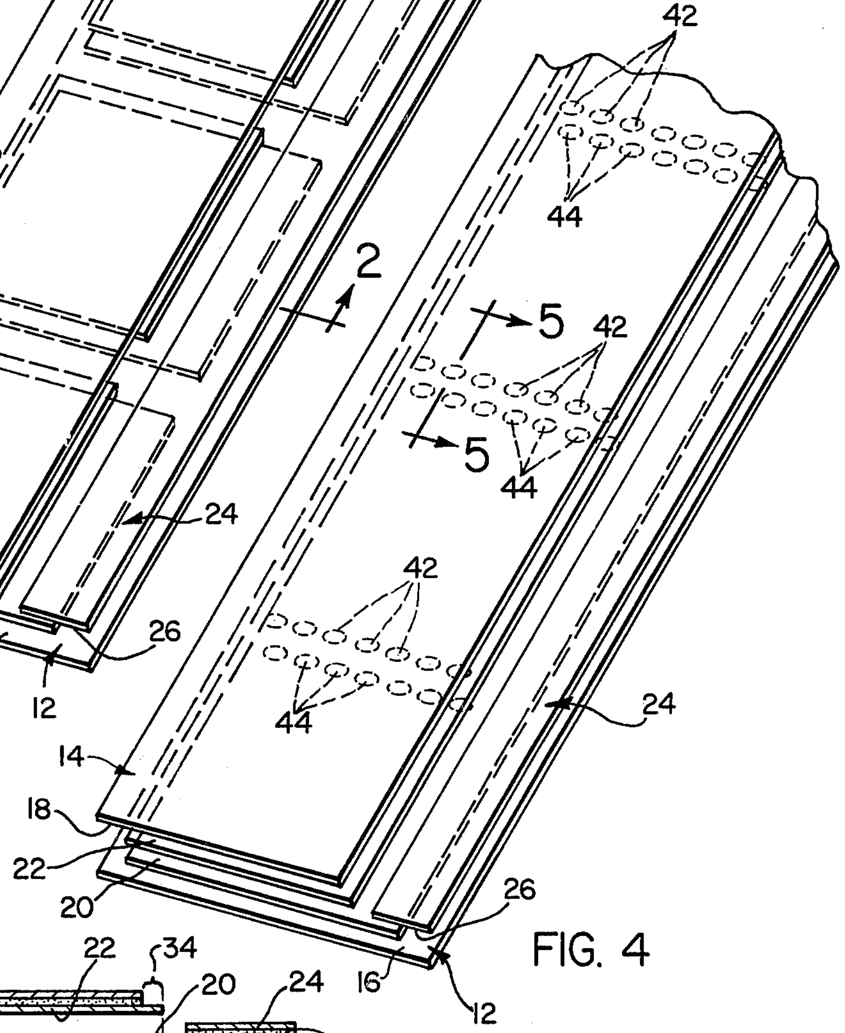
FIG. 4 is a view in exploded perspective of an alternative carrier constructed in accordance with the present invention.
Figure 5:
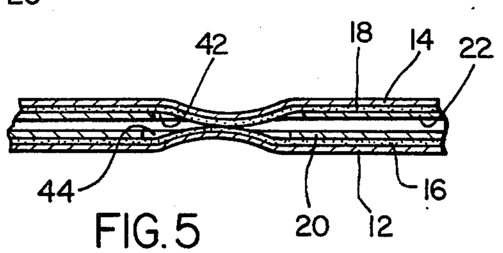
FIG. 5 is a cross-sectional view along lines 5—5 of FIG. 4.

An alternative embodiment of the present invention is illustrated in FIG. 4. In accordance with this embodiment, backing sheet 12, facing sheet 14 and end strip 24 are substantially identical to those elements as illustrated in the embodiment described in connection with FIGS. 1–2. Each of these elements has adhering to it a layer of polyethylene which serves as an adhesive. Likewise, clearances 34 and 36 are maintained. However, layers 20 and 22 are continuous in this embodiment rather than separate for each pocket. Accordingly, layers 20 and 22 may be fed from rolls the same way as the other elements which form a carrier as illustrated in FIG. 3. Pocket definition is achieved by providing a number of holes 42 in facing member 22 and a number of holes 44 in backing member 20 allowing facing sheet 14 to adhere to backing sheet 16 to define pocket seams, as illustrated in FIG. 5.

While a number of embodiments of the invention have been disclosed, it is, of course, understood that variations in the size, shape, arrangement and number of parts will be obvious to those of ordinary skill in the art. Such modifications are within the spirit and scope of the invention which is limited and defined only by the foregoing claims.

I claim:

1. A pocketed scroll for the holding and display of pages of reading material in a reel-to-reel reading machine, comprising:

(a) a flexible planar backing sheet having a width and a length much longer than its width;

(b) a layer of adhesive disposed over said flexible backing sheet;

(c) a pocket-forming flexible planar sheet disposed over said layer of adhesive, said pocket-forming flexible planar sheet defining a plurality of holes in bands periodically spaced along the length of said pocket-forming sheet, said bands extending across the width of said pocket-forming sheet;

(d) a flexible transparent planar facing sheet disposed over said pocket-forming sheet, said facing sheet having a width and a length substantially longer than its width, said facing sheet adhering to said backing sheet in the area defined by said holes.

2. A pocketed scroll as in claim 1, wherein said pocket-forming sheet is smaller in width than said backing sheet and positioned with one of its lengthwise edges disposed over said backing sheet and spaced from the respective lengthwise edge of said backing sheet, whereby said facing sheet adheres to said backing sheet in a narrow lengthwise area disposed along one edge of the inventive scroll.

3. A pocketed carrier for the presentation of pages of conventional printed matter in scroll form within a reel-to-reel reading machine comprising:

(a) a backing sheet having a width and a length much longer than its width;

(b) a relatively thin and transport facing sheet having a width and a length much longer than its width, said facing sheet being disposed over said backing sheet;

(c) a layer of adhesive material having a width and a length substantially longer than its width, said adhesive material being different from the material of which said facing sheet is made and said adhesive material being positioned between said facing and backing sheets, being disposed on one of said sheets and adhered selectively to the other sheet; and (d) sheet means, disposed between said adhesive layer and said other sheet, said sheet means being positioned, configured and dimensioned to achieve selective adhesion between said facing and backing sheets along seams disposed across the width of and periodically along the length of said facing and backing sheets after activation of said adhesive layer, said seams being positioned, configured and dimensioned to define a plurality of pockets, periodically disposed along the length of said carrier, each of said pockets being defined between a pair of adjacent seams, the width of said sheet means extending across the width of said backing sheet from a first position over said backing sheet to a second position over said backing sheet and said facing sheet extending from a point between the edge of the backing sheet, adjacent said first position, and the first position, and extending toward but not reaching said second position, to define a clearance between the edge of said facing sheet and said second position.

4. A pocketed carrier as in claim 3, wherein said sheet means comprises a plurality of separate sheets positioned along the length of the carrier and spaced from each other, said sheets being configured and dimensioned to achieve said selective adhesion along seams periodically spaced along the length of said carrier.

5. A carrier as in claim 3, wherein said point lies between the edge of said backing sheet adjacent the first position and said first position to define a continuous strip of lamination, between overlying edges of said facing and backing sheets.

6. A carrier as in claim 5, wherein said adhesive layer is comprised of a latent and heat-activated adhesive material.

7. A pocketed carrier for the presentation of pages of conventional printed matter in scroll form within a reel-to-reel reading machine comprising:

(a) a backing sheet having a width and a length much longer than its width;

(b) a relatively thin and transparent facing sheet having a width and a length much longer than its width, said facing sheet being disposed over said backing sheet;

(c) a layer of adhesive material having a width and a length significantly longer than its width, said adhesive material being different from the material of which said facing sheet is made and said adhesive material being positioned between said facing and backing sheets, being disposed on one of said sheets and adhered to the other sheet;

(d) first sheet means, disposed between said adhesive layer and said other sheet, said sheet means being positioned, configured and dimensioned to achieve selective adhesion between said facing and backing sheets along seams disposed across the width of said facing and backing sheets after activation of said adhesive layer, said seams being positioned, configured and dimensioned to define a plurality of pockets disposed along the length of said carrier, each of said pockets being defined between a pair of adjacent seams;

(e) a second layer of adhesive material disposed on the other of said sheets and between said facing and backing sheets; and (f) second sheet means positioned between the other of said sheets and said first sheet means, said second sheet means being positioned, configured and dimensioned to allow said selective adhesion.

8. A carrier as in claim 7, wherein said adhesive layers are coterminous with the sheets to which they are bound and wherein adhesion between said facing and backing sheets is substantially achieved by bonding of said adhesive layers to each other.

9. A carrier as in claim 8, wherein said adhesive layers are comprised of a latent and heat-activated adhesive material.

* * * * *